(12) United States Patent
Sharma

(10) Patent No.: US 10,791,021 B1
(45) Date of Patent: Sep. 29, 2020

(54) STORAGE AND RETRIEVAL OF PARAMETERS FOR INFRASTRUCTURE-AS-CODE COMPUTING SERVICES

(71) Applicant: Amazon Technologies, Inc., Seattle, WA (US)

(72) Inventor: Anuj Premnarayan Sharma, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 15/619,297

(22) Filed: Jun. 9, 2017

(51) Int. Cl.
*G06F 15/173* (2006.01)
*H04L 12/24* (2006.01)
*G06F 16/951* (2019.01)

(52) U.S. Cl.
CPC ........ *H04L 41/0803* (2013.01); *G06F 16/951* (2019.01)

(58) Field of Classification Search
CPC .......................... H04L 41/0803; G06F 16/951
USPC ................. 709/226, 203, 221, 225; 717/105
See application file for complete search history.

(56) References Cited

U.S. PATENT DOCUMENTS

| | | | | |
|---|---|---|---|---|
| 9,208,032 B1* | 12/2015 | McAlister | ............ | G06F 11/1435 |
| 9,390,128 B1* | 7/2016 | Seetala | ............. | G06F 16/24524 |
| 2003/0228147 A1* | 12/2003 | Brahim | .............. | H04Q 11/0062 |
| | | | | 398/50 |
| 2004/0167981 A1* | 8/2004 | Douglas | .................. | H04L 41/12 |
| | | | | 709/225 |
| 2009/0006543 A1* | 1/2009 | Smit | .................... | H04L 67/2842 |
| | | | | 709/203 |
| 2013/0167109 A1* | 6/2013 | Nucci | ....................... | G06F 9/44 |
| | | | | 717/105 |
| 2014/0173200 A1* | 6/2014 | Aue | ........................ | G06F 16/00 |
| | | | | 711/118 |
| 2014/0207918 A1* | 7/2014 | Kowalski | ............ | H04L 41/0803 |
| | | | | 709/220 |
| 2016/0164723 A1* | 6/2016 | Cimprich | ............ | H04L 41/0806 |
| | | | | 709/221 |
| 2016/0294949 A1* | 10/2016 | Motwani | ............. | H04L 67/1097 |
| 2017/0026416 A1* | 1/2017 | Carpenter | ........... | H04L 41/0866 |
| 2017/0180211 A1* | 6/2017 | Johnson | .................. | H04L 67/10 |
| 2018/0013707 A1* | 1/2018 | Murphy | .................. | H04L 51/08 |
| 2018/0101399 A1* | 4/2018 | Jain | ......................... | G06F 9/485 |
| 2018/0260302 A1* | 9/2018 | Mola | ...................... | G06F 16/43 |

\* cited by examiner

*Primary Examiner* — Thuong Nguyen
(74) *Attorney, Agent, or Firm* — Lee & Hayes, P.C.

(57) ABSTRACT

Technologies are disclosed for storage and retrieval of parameters used in the creation and editing of infrastructure-as-code (IAC) templates. An infrastructure-as-code ("IAC") template related to desired resources available in a service provider network for configuring a stack of the desired resources in the service provider network is provided. The IAC template includes an identification of a key-value pair associated with resource definitions related to the desired resources and are stored in a data store. Based upon the identification of the key-value pair, a look-up function is used to call a stateless event driven compute service function to query the data store for the resource definitions. Once the resource definitions are received from the data store, based upon the IAC template and the resource definitions, the stack of the desired resources is configured.

20 Claims, 8 Drawing Sheets

US 10,791,021 B1

STORAGE AND RETRIEVAL OF PARAMETERS FOR INFRASTRUCTURE-AS-CODE COMPUTING SERVICES

BACKGROUND

Some network-based computing service providers allow users to purchase and utilize computing resources, such as virtual machine ("VM") instances, on a permanent or as-needed basis. In addition to VM instances, such computing service providers typically allow customers to purchase and utilize other types of computing resources. For example, customers might be permitted to purchase access to and use of file and block data storage resources, data store resources, networking resources, and other types of computing resources. Utilizing these computing resources as building blocks, customers of such a network-based computing service can create custom solutions that provide various types of functionality, such as application hosting, backup and storage, content delivery, World Wide Web ("Web") hosting, enterprise information technology ("IT") solutions, data store services, and others.

Often, users of such computing resources utilize infrastructure-as-code ("IAC") practices using IAC templates to provision the computing resources. As more and more entities utilize IAC practices, especially within an organization, the number of IAC templates to provision resources increases. As a result, obtaining complete visibility with respect to values for parameters and mapping of the resources can be challenging. Moreover, within a specific group of users or a team of users, many of the values for parameters and mappings of resources can be reused in various applications that the group of users or team of users own.

The disclosure made herein is presented with respect to these and other considerations.

DETAILED DESCRIPTION

Figure 1A:
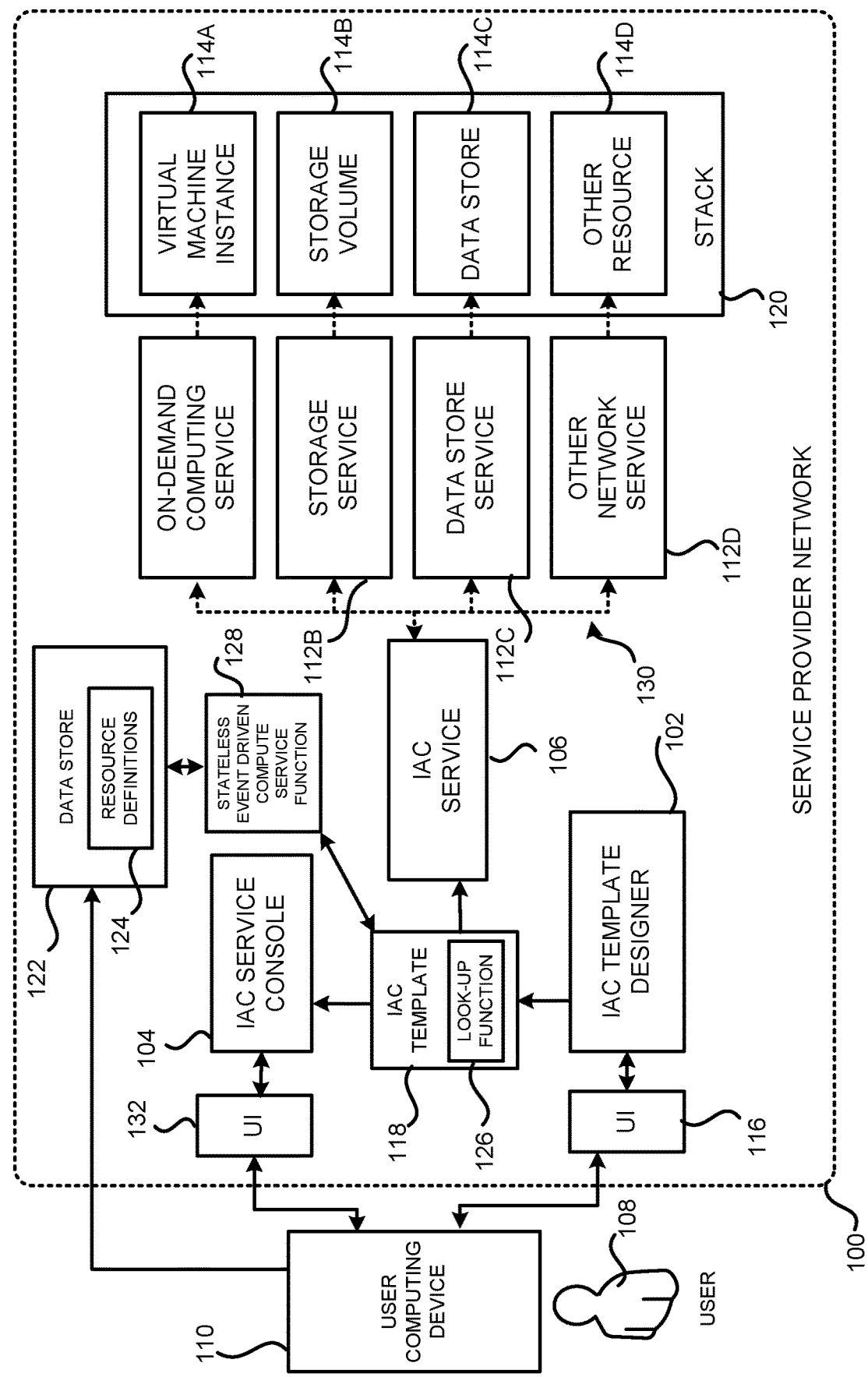
FIGS. 1A and 1B are software and network architecture diagrams illustrating aspects of the configuration and utilization of an IAC template designer, an IAC service console, an associated IAC service and a data store that stores resource definitions, according to one particular configuration.

The following detailed description is directed to technologies for storing and retrieval of resource definitions in the form of parameter objects and mapping objects in a data store for use during creation and editing of infrastructure-as-code ("IAC") templates. Through an implementation of the disclosed technologies, parameters for IAC templates that provision infrastructure in a network-based computing environment can be shared among IAC templates maintained by the same user or team of users. The parameters are more efficiently stored and retrieved thereby saving processing cycles, power and time. Technical benefits other than those specifically mentioned herein can also be realized through an implementation of the disclosed technologies.

In order to enable the functionality disclosed herein, an IAC template designer and an associated IAC service are executed in a service provider network that is configured to provide computing resources on a permanent or an as-needed basis. Among other types of functionality, the computing resources provided by the service provider network can be utilized to implement the various network services and other programs described herein. The computing resources (which might be referred to herein simply as "resources" or a "resource") provided by the service provider network can include various types of computing resources, such as data processing resources like VM instances, data storage resources, networking resources, data communication resources, network services, and the like.

The IAC template designer provides a user interface ("UI") for creating and editing IAC templates. In configurations, the UI may be a graphical user interface ("GUI"). Data related to resource definitions for the IAC templates may be in the form of various parameter objects and mapping objects that may be stored in a data store.

The IAC service can consume IAC templates and utilize the data stored in the data store to instantiate computing resources in the service provider network. For example, and without limitation, a resource definition for an IAC template might specify that a VM instance is to be created that is connected to a storage volume and a data store. In this example, the IAC service can interact with an on-demand computing service to provision the VM instance, interact with a storage service to provision the storage volume, interact with a data store service to provision the data store, and configure the VM instance to access both the storage volume and the data store. The IAC service can also interact with other services to provision other types of resources in the service provider network. The collection of resources defined by an IAC template might be referred to herein as a "stack."

The UI provided by the IAC template designer can include a resource list that includes a list of items corresponding to resources in the service provider network. In one configuration, the IAC template designer generates the list of items utilizing resource definitions for the resources in the service provider network. The resource definitions included in the data store include data specifying, for each of the available resources, whether a resource is an element or a container for other elements, the available connection types for the resources, as well as other or different information.

In configurations, code usable by the IAC service can also be added to an IAC template. The code in the IAC template and the data store can be expressed using a declarative language, such as JAVASCRIPT OBJECT NOTATION ("JSON"), YAML, EXTENSIBLE MARKUP LANGUAGE ("XML"), or another type of language capable of describing an infrastructure, including resources, dependencies between the resources, and connections between the resources.

In configurations, the data relating to the resource definitions may be manually input into the data store by a user. The data may be stored in the data store utilizing key-value pairs. In configurations, a user name and application environment may be used as a partition key and an application name upon which the IAC template is based may be used as a sort key. The data may be retrieved by an IAC template from the data store utilizing stateless event driven compute services. In configurations, a resource or function may be included in each IAC template that may be used to call a look-up stateless event driven compute service function using a key-value pair as an input. In configurations, the look-up resource may be included in the IAC service.

The stateless event driven compute service function is a software function that executes associated computing functionality upon occurrence of a preset set of occurrences, and which does not require computing infrastructure resources to be dedicated to its maintenance. In this way, software programmers may utilize an event driving compute service function may be configured to perform an operation (e.g., query a data store) based upon the occurrence of one or more triggering events (e.g., receiving a key-value pair), without needing to provision computing resources to maintaining a data store query service. In some embodiments, the stateless event driven compute service function may be maintained and or otherwise hosted by a network service. The data store may then respond back to the stateless event driven compute service function with the results. The stateless event driven compute service function may then provide the results to the resource of the IAC template. The results related to the key-value pair may then be used to configure the resources in the stack.

In configurations, data related to the resource definitions may be initially entered and/or updated in the data store by inserting the data into a configuration file and inserting the configuration file into a script. The script may make a network services application programming interface ("API") call to input the data into the data store.

Once a user has entered or updated the data related to resource definitions in the data store and completed the definition or editing of an IAC template in the IAC template designer, the user can request that a stack be created in the service provider network. Responsive thereto, the IAC template designer can provide the IAC template to the IAC service. The IAC service can, in turn, utilize the IAC template and the resource definitions retrieved from the data store to provision the resources and connections defined by the IAC template in the service provider network. Additional details regarding the various components and processes described briefly above for storing and retrieval of parameters for IAC computing services will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1A is a software and network architecture diagram of a service provider network 100 (which might be referred to herein as the "SPN 100") illustrating aspects of the configuration and utilization of an IAC template designer 102, an IAC service console 104 and an associated IAC service 106 disclosed herein, according to one particular configuration. As discussed briefly above, the service provider network 100 is a computing network configured to provide computing resources (which might be referred to simply as "resources") on a permanent or an as-needed basis. Among other types of functionalities, the computing resources provided by the service provider network 100 can be utilized to implement various types of network services. The computing resources provided by the service provider network 100 can include various types of computing resources, such as data processing resources like virtual machine ("VM") instances, data storage resources, networking resources, data communication resources, network services, and the like.

A user 108 of the service provider network 100 can utilize an appropriate computing system, such as the user computing device 110, to communicate with the service provider network 100 over an appropriate data communications network (not illustrated in FIG. 1). In this way, the user 108 (or a party authorized by the user 108) of the service provider network 100 can configure various aspects of the operation of the computing resources provided by the service provider network 100, or to otherwise control any computing resources being utilized by the user 108. For example, and without limitation, the computing system 110 utilized by the user 108 of the service provider network 100 can be utilized to obtain computing resources in the service provider network 100, to configure aspects of the operation of the computing resource, to access and utilize functionality provided by the various services and systems described herein, and/or to perform other types of functionality with regard to the operation of the computing resources provided by the service provider network 100.

The computing device 110 can be any type of computing device capable of connecting to the service provider network 100 via a suitable data communications network such as, but not limited to, a laptop or desktop computer, a tablet computing device, a server computer, a smartphone, etc. Administrative users employed by the owner or operator of the service provider network 100, such as administrators managing the operation of the service provider network 100, can also connect with, manage, and utilize resources provided by network services executing within the service provider network 100 in a similar fashion. Additional details regarding the configuration and operation of the service provider network 100 will be provided below with regard to FIGS. 4-7.

As discussed briefly above, the service provider network 100 can also be configured to execute various types of network services 112. For example, and without limitation, the service provider network 100 can execute an on-demand computing service 112A, a storage service 112B, a data store service 112C, and other network services 112D, some of which are described in greater detail below. Each of the network services 112 can provide different types of computing resources 114 and/or functionality. For instance, the on-demand computing service 112A can provide VM instances 114A, the storage service 112B can provide a storage volume 114B, and the data store service 112C can provide a data store 114C. Other network services 112D can provide other computing resources 114D. In this regard, it should be appreciated that the network services 112 and the computing resources 114 identified herein are merely illustrative and that other types of network services can provide other types of resources and functionality in other configurations.

As also discussed briefly above and in greater detail below, the IAC template designer 104 provides a user interface 116 for creating and editing IAC templates 118 that a user may use to provision desired computing resources 114 from services 112. The provisioned computing resources may be arranged in what is often referred to as a "stack" 120. The IAC service 106 can consume an IAC template 118 generated or edited using the IAC template designer 102 in conjunction with data retrieved from a data store 122, as will be described in more detail herein, to instantiate a collection of computing resources 114 in the service provider network 100 in the form of a stack 120. In configurations, the data store 122 may be implemented as a data store provided by the data store service 112C.

The data stored in the data store 122 generally relates to resource definitions 124. The resource definitions 124 generally relate to parameter objects and mapping objects, which may be collectively referred to herein as "parameters." Parameter objects may correspond to parameters associated with parameterized queries, in/our arguments, return values of stored procedures, etc. Mapping objects may correspond to objects that store associations between content with a location source location for the content. The resource definitions 124 can therefore include settings, inputs, identities of resources and/or groups of resources, mapping of resources among users 108 and/or within zones or regions of the service provider network 100, etc., for the computing resources 114 in a particular stack 120. For example, in configurations, the resource definitions 124 can include data specifying, for each of the available resources 114, whether a resource 114 is an element or a container for other elements and an identity of the resource 114.

A resource 114 that is a container can have other types of resources 114 located within it. For example, and without limitation, a virtual private cloud ("VPC") resource is a container that can have other types of resources 114, such as VM instances, located within it. Other types of resources 114 in the service provider network 100 can also be considered to be containers in a similar manner. The resource definitions 124 can also include, for example, data that specifies the valid connection types for the resources 114. For example, and without limitation, a VM instance 114A can validly connect to a storage volume 114B and a data store 114C, and vice versa.

In configurations, the user 108 (or a party authorized by the user 108) may enter and/or edit the resource definitions 124 in the data store 122 using the computing device 110 (or another computing device). The resource definitions 126 may be stored in the data store 122 based upon key-value pairs. In configurations, a user name and application environment may be used as a partition key and an application name may be used as a sort key. In configurations, if duplicate key-value pairs of resource definitions 124 are entered, then the most current key-value pair is deemed valid and may be used to overwrite any earlier duplicate key-value pairs.

In configurations, a look-up function 126 is included in the IAC template 118 that calls a stateless event driven compute service function 128 to retrieve resource definitions 124 based upon a key-value pair for a particular IAC template 118. When the IAC template is consumed by the IAC service 106, the look-up function 126 calls the stateless event driven compute service function 128 to obtain the resource definitions 124. In configurations, the look-up function 126 may be included in the IAC service 106 instead of the IAC template 118.

Thus, for example, and without limitation, the resource definitions 124 retrieved from the data store 122 might specify that, for a particular IAC template 118, a VM instance 114A is to be created along with and connected to a storage volume 114B and a data store 114C in a particular stack 120. In this example, the IAC service 106 can utilize a control plane 130 to interact with the on-demand computing service 112A to provision the VM instance 114A, interact with the storage service 112B to provision the storage volume 114B, interact with the data store service 112C to provision the data store 114C and configure the VM instance 114A to access both the storage volume 114B and the data store 114C. The IAC service 106 can also interact with other network services 112D via the control plane 130, based upon the retrieved resource definitions and the particular IAC template 118, to provision other types of resources 114D in the service provider network 100 for the particular stack 120.

According to various configurations, the code in the IAC template 118 may be expressed using a declarative language, such as JSON, YAML, or XML. In this regard it should be appreciated, however, that another type of language capable of describing an infrastructure in a service provider network 100, including resources, dependencies between the resources, and connections between the resources, can be utilized in other configurations.

As illustrated in FIG. 1A, the IAC service 106 and the IAC template designer 102 can operate in conjunction with the IAC service console 104 in some configurations. Among other types of functionality, in configurations the IAC service console 104 may provide a UI 132 for managing and monitoring the status of a stack 120 that has been provisioned in the service provider network 100.

Similarly, a GUI button or other type of control can be provided in the UI 116 presented by the IAC template designer 102 which, when selected will return the user 108 to a page in the UI 132 for creating a stack 120. The location of the IAC template 118 that is to be utilized to create the stack 120 in the storage service 112B can also be returned to the IAC service console 104 following such a selection. The IAC service console 104 can then retrieve the IAC template 118 and utilize its contents, along with retrieved resource definitions 124 based upon a key-value pair in the retrieved IAC template 118, to generate a request to the IAC service 106 to generate the stack 120 defined therein.

A user 108 can also select an existing stack 120 in the IAC service console 104 and select a UI control which, when selected, will open the IAC template designer 102 with the IAC template 118 for the selected existing stack 120. The user 108 can then modify or edit the IAC template 118 for the stack 120 in the IAC template designer 102. When the user 108 has completed editing the stack 120, the user can select a GUI button or other type of GUI control which, when selected, will return the user 108 to a page in the UI 132 for creating a stack 120. As in the example given above, the location of the IAC template 118 that is to be utilized to create the stack 120 in the storage service 112B can also be returned to the IAC service console 104 following such a selection.

Once a user 108 has completed the creation or editing of an IAC template 118 in the IAC template designer 102, the user 108 can request that a stack 120 be created in the service provider network 100 that includes the resources 114 defined by the IAC template 116. Responsive thereto, the IAC template designer 102 can provide the IAC template 118 (or a link to the IAC template 118) to the IAC service 106. Alternately, the IAC template designer 102 can provide a link to the IAC template 118 in the storage service 112B to the IAC service console 104 which, in turn, can make the request to the IAC service 106 to create the stack 120.

The IAC service 106 can, in turn, request resource definitions 124 based upon a key-value pair in the IAC template 118, if the look-up function 126 is included in the IAC template 118. The IAC service 106 can use the look-up function 126 to call the stateless event driven compute function 128 to retrieve the resource definitions 124 based upon the key-value pair. Alternately, the IAC template 118 may have utilized the look-up function 126 to retrieve the resource definitions 124 from the data store 122 and thus, may include the resource definitions 124. The IAC service 106 can then utilize the IAC template 118, the retrieved resource definitions 124 and the control plane 130 to provision the resources 114 and connections between the resources 114 defined by the resource definitions 124 in the service provider network 100.

Figure 1B:
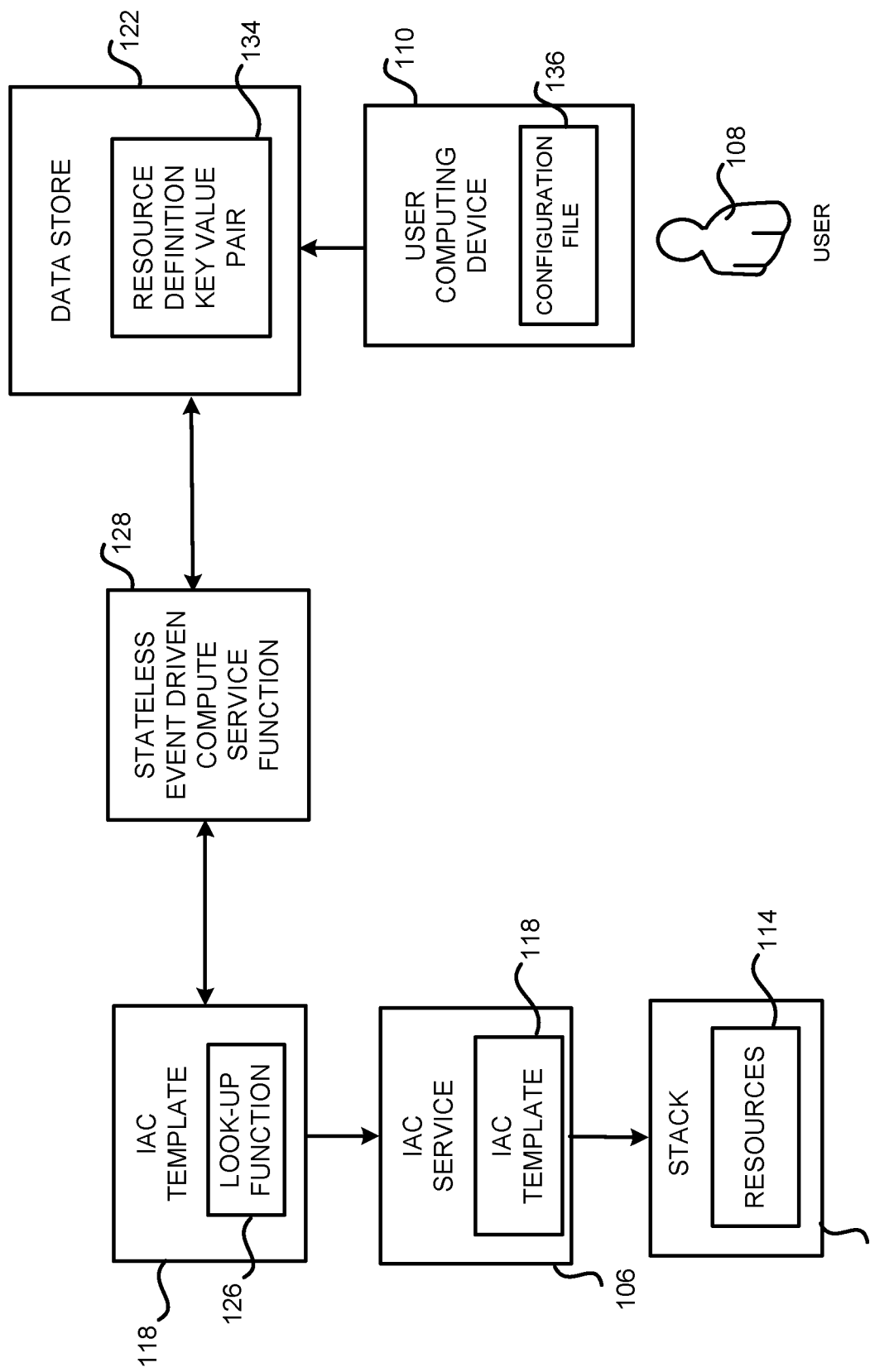

FIG. 1B illustrates various components of FIG. 1A for storing and retrieving resource definitions 124 for use with an IAC template 118. One or more users 108 may input and/or edit data for resource definitions 124 using a computing device 110. The resource definitions 124 values may be organized by key-value pairs 134. In configurations, the name of the user(s) 108 or a team name and the application environment may be utilized as a partition key, while a sort key may be the application name.

In configurations, the resource definitions 124 for a particular application and a key-value pair 134 associated with the resource definitions 124 may be input into a configuration file 136 using the computing device 110. A script may then load the key-value pair 134 and associated resource definitions 124 in the configuration file 136 into the data store 122.

When an IAC template 118 is being created or edited to provision resources 112 for a stack 120, the look-up function 126 within the IAC template 118 is utilized to call the stateless event-driven compute service function 128 to retrieve the desired key-value pair 134 and corresponding resource definitions 124. The stateless event-driven compute service function 128 then retrieves the data associated with the key-value pair 134 in the IAC template 118 from the data store 122. The resource definition values associated with the key-value pair 134 are then returned from the data store 122 and provided to the stateless event-driven compute service function 128.

The stateless event-driven compute service function 128, in turn, provides the data associated with the key-value pair 134 to the IAC template 118. Alternately, in configurations the look-up function 126 may be included in the IAC service 106, which may utilize a key-value pair 134 in an IAC template 118 to use the look-up function 126 to call the stateless event driven compute service function 128 to retrieve the key-value pair 134 and associated resource definition values.

Based upon the returned data of the key-value pair 134 and the IAC template 118, the IAC service 106 creates a stack 120 of computing resources 114. Computing resources 114 within the stack 120 are configured according to the data associated with the key-value pair 134 and may utilize the resource definitions 124 within the key-value pair 134 to provide desired functionality within the stack 120.

Figure 2:
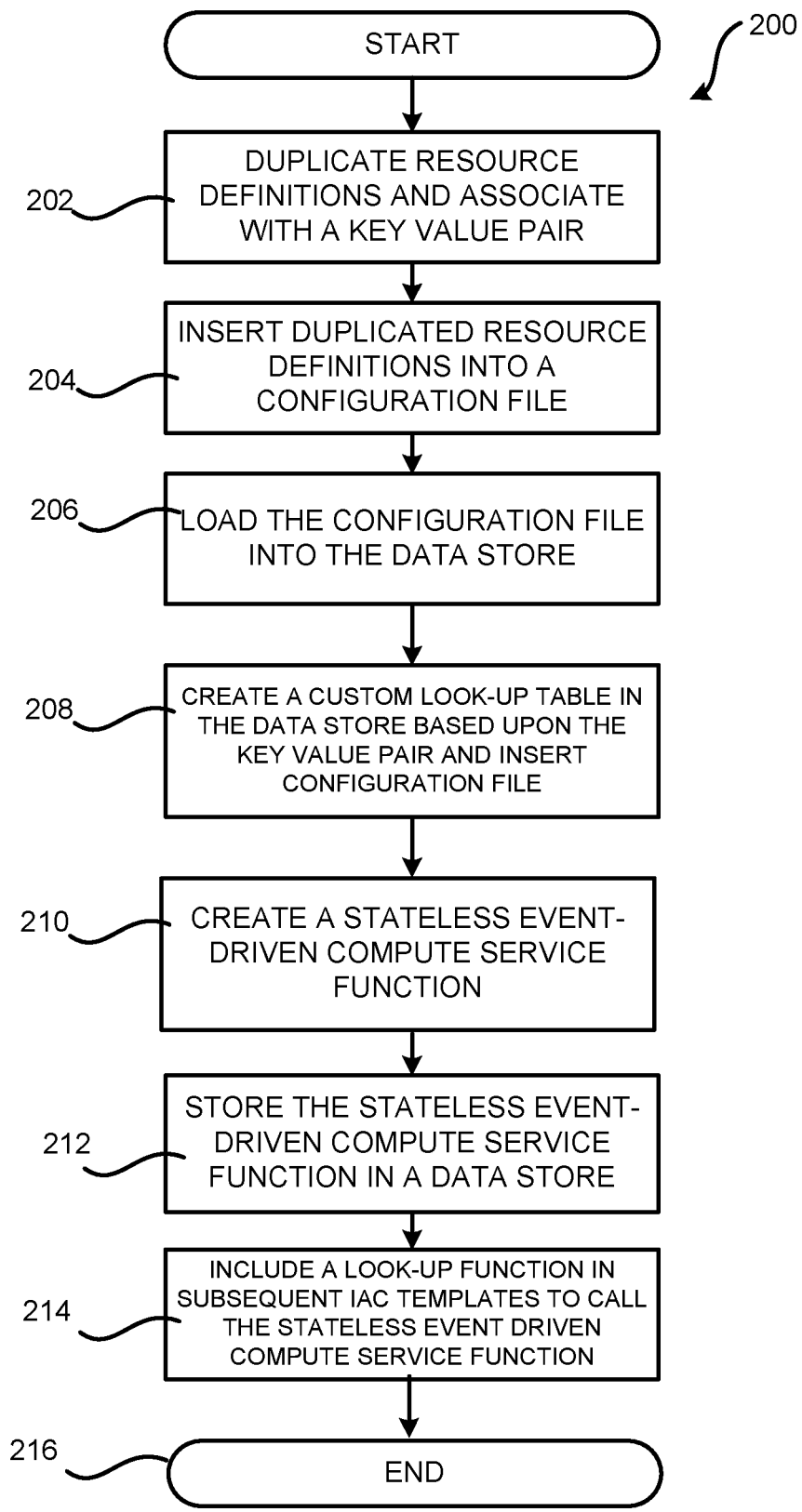
FIG. 2 is a flow diagram illustrating a routine that shows aspects of one mechanism disclosed herein for moving resource definitions from an existing IAC template to a central look-up table, according to one particular configuration.
Figure 3:
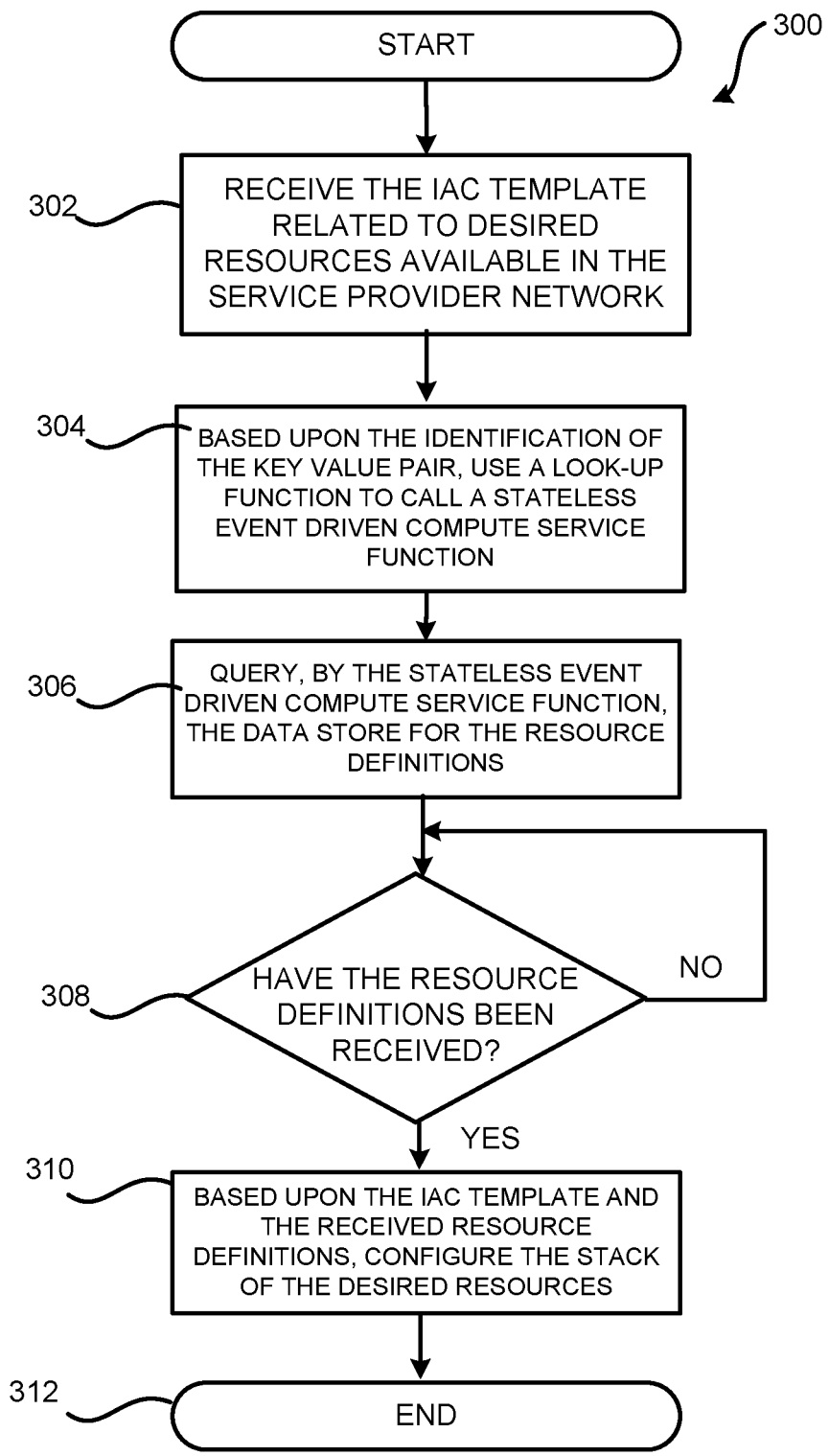
FIG. 3 is a flow diagram illustrating a routine that shows aspects of one mechanism for the retrieval and use of resource definitions in creating a stack of resources in a service provider network using an IAC template, according to one particular configuration.

FIGS. 2 and 3 are flow diagrams illustrating a routine 200 that illustrates aspects of moving resource definitions 124 from an existing IAC template 118 to the central look-up table 122 illustrated in FIGS. 1A and 1B, and a routine 300 that illustrates aspects of the retrieval and use of resource definitions in creating a stack of resources using an IAC template, respectively. It should be appreciated that the logical operations described herein with respect to FIGS. 2 and 3, and the other FIGs. can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than illustrated in the FIGS. and described herein. These operations can also be performed in parallel, or in a different order than those described herein. Some or all of these operations can also be performed by components other than those specifically identified.

The routine 200 begins at operation 202, where resource definitions 124 are cloned or duplicated and associated with a key-value pair 134. The key-value pair 134, as previously noted, in configurations may utilize the name of the user or team of users and an application environment as a partition key, while the name of an application associated with the IAC template 118 may be utilized as the sort key.

At operation 204, the resource definitions 124 that have been duplicated are inserted into a configuration file 136 in the appropriate descriptive language (e.g., JSON or YMAL, XML, etc.). At operation 206, a script may be utilized to load the resource definitions in the configuration file 136 into the data store 122. At operation 208, the script creates a custom look-up table in the data store 122 based upon the key-value pair 134 and the resource definitions 124 in the configuration file 136 are inserted into the data store 122.

From operation 208, the routine 200 proceeds to operation 210, where a script may be utilized to create a stateless event-driven compute service function 128. At operation 212, the stateless event-driven compute service function 128 may be stored in a data store. At operation 214, subsequent IAC templates 118, either created or modified, desiring to use the resource definitions 124 include a look-up function 126 to call the stateless event driven compute service function 128, as well as an identity of the appropriate key-value pair 134. When the IAC template 118 is utilized to create a stack 120, the stateless event-driven compute service function 128 may be utilized to retrieve the resource definitions 124 associated with the key-value pair 134 from the data store 122. The routine 200 ends at operation 216.

FIG. 3 is a flow diagram illustrating a routine 300 that illustrates aspects of the retrieval and use of resource definitions, e.g., resource definitions 124, in creating a stack, e.g., stack 120, of resources, e.g. resources 120, in a service provider network, e.g., service provider network 100, using an IAC template, e.g., IAC template 118. The routine 300 begins at operation 302, where the IAC template related to desired resources available in the service provider network is received. The IAC template is defined for configuring a stack of the desired resources in the service provider network. The IAC template includes an identification of a key-value pair associated with resource definitions related to the desired resources, where the key-value pair is stored in a data store, e.g., data store 122.

At operation 304, based upon the identification of the key-value pair, a look-up function is used to call a stateless event driven compute service function. At operation 306, the stateless event driven compute service function queries the data store for the resource definitions.

From operation 306, the routine 300 proceeds to operation 308, where it is determined if the resource definitions have been received from the data store. At operation 310, based upon the IAC template and the received resource definitions, the stack of the desired resources is configured. From operation 310, the routine proceeds to operation 312, where it ends.

Figure 4:
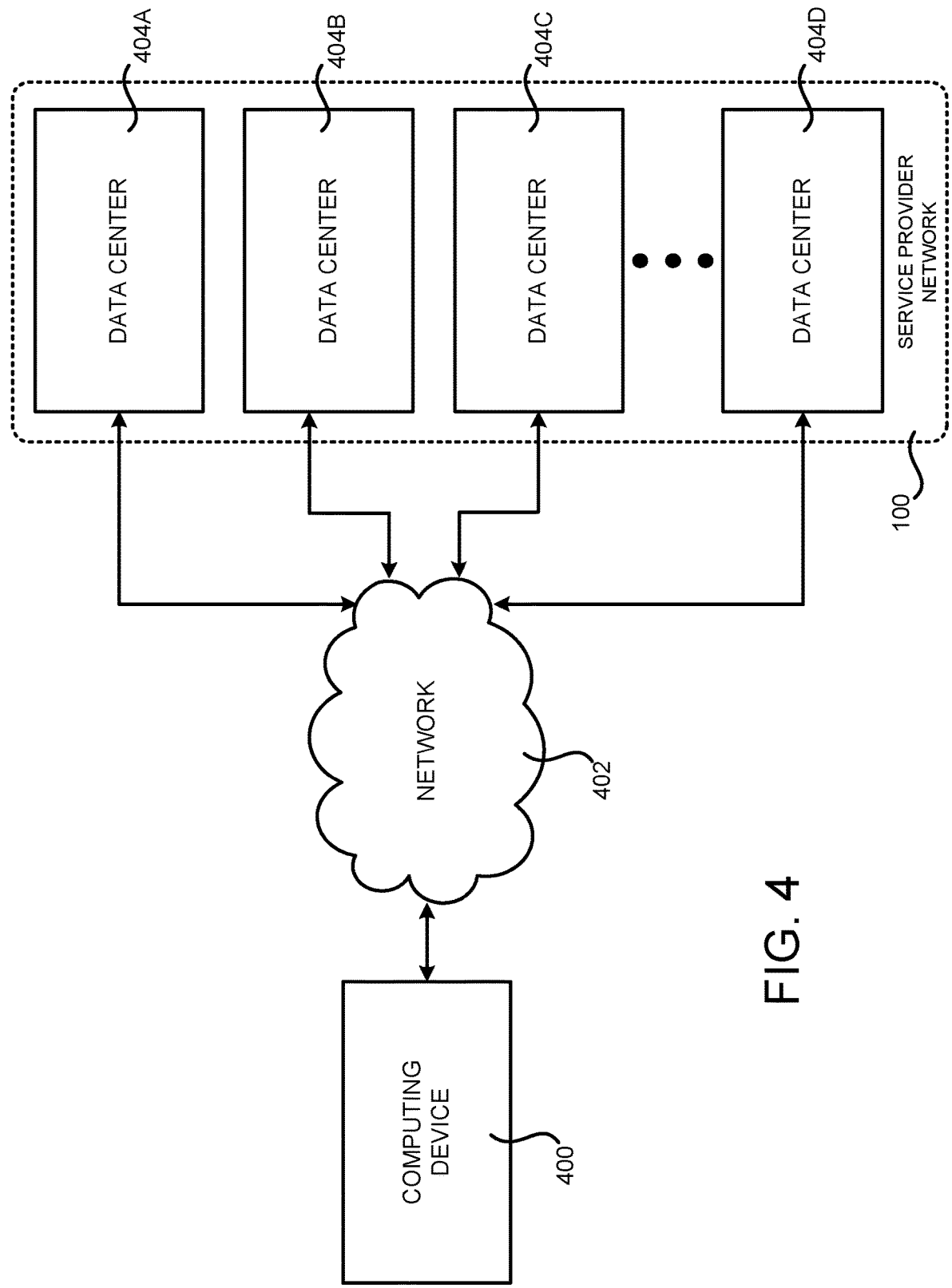
FIG. 4 is a system and network diagram that illustrates an illustrative operating environment that includes a service provider network that can be configured to implement aspects of the functionality described herein.

FIG. 4 is a system and network diagram that illustrates one illustrative operating environment for the configurations disclosed herein that includes a service provider network 100 that can be configured to execute the IAC service 106, the IAC template designer 102, the IAC service console 104, the stateless event driven compute service function 128 and to provide the data store 122 in the manner described above, according to one configuration disclosed herein. As discussed above, the service provider network 100 can execute network services that provide computing resources on a permanent or an as-needed basis. Among other types of functionality, the computing resources provided by the service provider network 100 can be utilized to implement the various network services described herein. As also discussed above, the computing resources provided by the service provider network 100 can be data processing resources, such as VM instances, data storage resources, networking resources, data communication resources, network services, and other types of resources.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, data store servers, some or all of the network services described above, and/or other types of programs. Data storage resources can include file storage devices, block storage devices, and the like. The service provider network 100 can also be configured to provide other types of computing resources not mentioned specifically herein.

As also discussed above, the computing resources provided by the service provider network 100 are enabled in one implementation by one or more data centers 404A-404D (which might be referred to herein singularly as "a data center 404" or collectively as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The users of the service provider network 100 can access the computing resources provided by the service provider network 100 over a network 402, which can be a wide area communication network ("WAN"), such as the Internet, an intranet or an Internet service provider ("ISP") network or a combination of such networks. For example, and without limitation, a computing device 400 operated by a user of the service provider network 100, such as the user computing device 110, can be utilized to access the service provider network 100 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
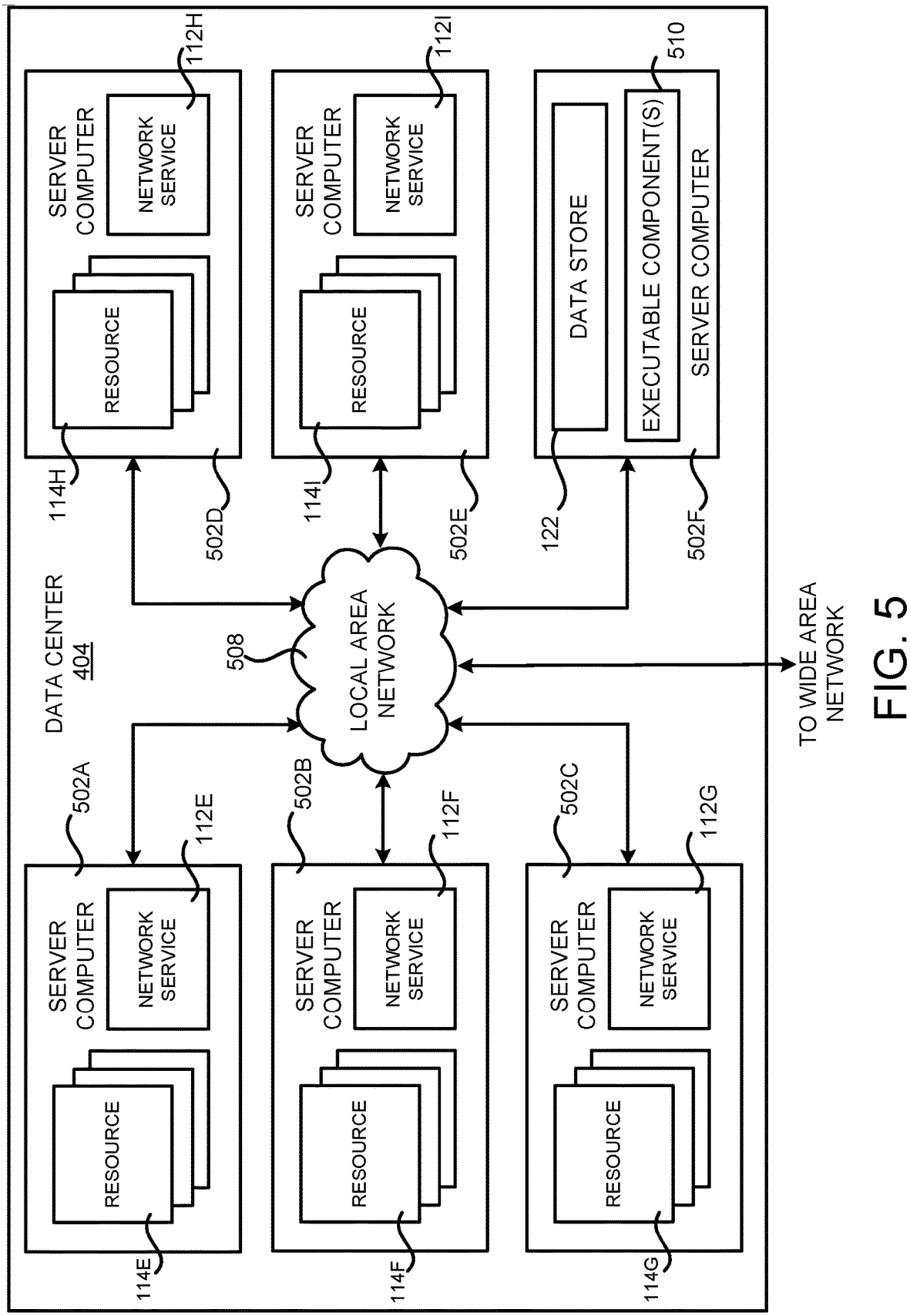
FIG. 5 is a computing system diagram illustrating a configuration for a data center that can be utilized to implement aspects of the technologies disclosed herein.

FIG. 5 is a computing system diagram that illustrates one configuration for a data center 404 that can be utilized to implement the IAC service 106, the IAC service console 104, the IAC template designer 102 the stateless event driven compute service function 128, the data store 122 and the other network services 112 disclosed herein. The example data center 404 illustrated in FIG. 5 includes several server computers 502A-502F (which might be referred to herein singularly as "a server computer 502" or in the plural as "the server computers 502") for providing the computing resources 114A-114I.

The server computers 502 can be standard tower, rackmount, or blade server computers configured appropriately for providing the various computing resources described herein (illustrated in FIG. 5 as the computing resources 114E-114I). As mentioned above, the computing resources 114 provided by the service provider network 100 can be data processing resources such as VM instances or hardware computing systems, data storage resources, data store resources, networking resources, and others. Some of the servers 502 can also be configured to execute network services 112A-112I, respectively, capable of instantiating, providing and/or managing the computing resources 114A-114I, some of which are described in detail below with regard to FIG. 6.

The data center 404 illustrated in FIG. 5 also includes a server computer 502F that can execute some or all of the software components described above. For example, and without limitation, the server computer 502F can be configured to execute the data store 122, which has been described in detail above. The server computer 502F can also be configured to execute other components and/or to store data for providing some or all of the functionality described herein. In this regard, it should be appreciated that components (e.g., executable components 510) or different instances of the server computer 502F can execute on many other physical or virtual servers in the data centers 404 in various configurations.

In the example data center 404 illustrated in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 404A-404D, between each of the server computers 502A-502F in each data center 404, and, potentially, between computing resources 114 in each of the data centers 404. It should be appreciated that the configuration of the data center 404 described with reference to FIG. 5 is merely illustrative and that other implementations can be utilized.

Figure 6:
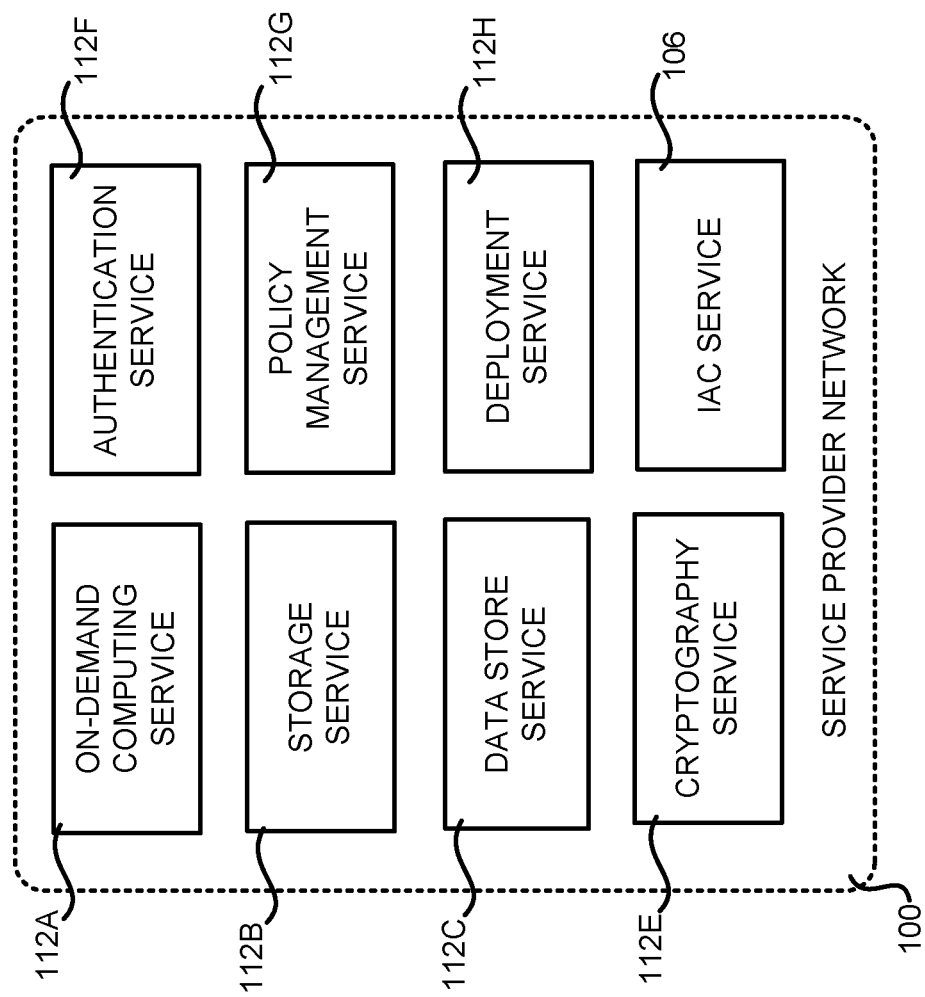
FIG. 6 is a network services diagram that illustrates aspects of several services that can be provided by and utilized within a service provider network configured to implement the various technologies disclosed herein.

FIG. 6 is a system and network diagram that illustrates aspects of several network services 112 that can be provided by and utilized within a service provider network 100 in one configuration disclosed herein. In particular, and as discussed above, the service provider network 100 can provide a variety of network services 112 to customers and other users of the service provider network 100 including, but not limited to, the on-demand computing service 112A, the storage service 112B, the data store service 112C (which can implement the data store 122), a cryptography service 112E, an authentication service 112F, a policy management service 112G, a deployment service 112H, and the IAC service 108. Additionally, the service provider network 100 can also provide other types of network services, some of which are also described in greater detail below.

It should be appreciated that customers of the service provider network 100 can include organizations or individuals that utilize some or all of the services 112 provided by the service provider network 100. As described above, a customer or other user can communicate with the service provider network 100 through a network, such as the network 402 illustrated in FIG. 4. Communications from a customer computing device, such as the user computing device 110 illustrated in FIGS. 1A and 1B, to the service provider network 100 can cause the services 112 provided by the service provider network 100 to operate in accordance with the described configurations or variations thereof.

It is noted that not all configurations described include the network services 112 illustrated in FIG. 6 and that additional network services 112 can be provided in addition to or as an alternative to the services 112 explicitly described herein. Each of the services 112 illustrated in FIG. 6 can also expose web service interfaces that enable a caller to submit appropriately configured application programming interface ("API") calls to the various services through web service requests. The various web services can also expose GUIs, command line interfaces ("CLIs"), and/or other types of interfaces for accessing the functionality that they provide.

In addition, each of the services 112 can include service interfaces that enable the services to access each other (e.g., to enable a VM provided by the on-demand computing service 112A to store data in or retrieve data from the storage service 112B). Additional details regarding some of the services illustrated in FIG. 6 will now be provided.

As discussed above, the on-demand computing service 112A can be a collection of computing resources configured to instantiate VM instances and to provide other types of computing resources 114 on demand. For example, a customer or other user of the service provider network 100 can interact with the on-demand computing service 112A (via appropriately configured and authenticated API calls, for example) to provision and operate VM instances that are instantiated on physical computing devices hosted and operated by the service provider network 100. The VM instances can be used for various purposes, such as to operate as servers supporting the network services described herein, a web site, to operate business applications or, generally, to serve as computing resources for the customer.

Other applications for the VM instances can be to support data store applications, electronic commerce applications, business applications and/or other applications. Although the on-demand computing service 112A is illustrated in FIG. 6, any other computer system or computer system service can be utilized in the service provider network 100 to implement the functionality disclosed herein, such as a computer system or computer system service that does not employ virtualization and instead provisions computing resources on dedicated or shared computers/servers and/or other physical devices.

The storage service 112B can include software and computing resources that collectively operate to store data using block or file-level storage devices (and/or virtualizations thereof). The storage devices of the storage service 112B can, for example, be operationally attached to virtual computer systems provided by the on-demand computing service 112A to serve as logical units (e.g., virtual drives) for the computer systems. A storage device can also enable the persistent storage of data used/generated by a corresponding virtual computer system where the virtual computer system service can only provide ephemeral data storage.

The service provider network 100 can also include a cryptography service 112E. The cryptography service 112E can utilize storage services of the service provider network 100, such as the storage service 112B, to store encryption keys in encrypted form, whereby the keys can be usable to decrypt customer keys accessible only to particular devices of the cryptography service 112E. The cryptography service 112E can also provide other types of functionality not specifically mentioned herein.

As illustrated in FIG. 6 and discussed above, the service provider network 100, in various configurations, also includes an authentication service 112F and a policy management service 112G. The authentication service 112F, in one example, is a computer system (i.e., collection of computing resources 114) configured to perform operations involved in authentication of users. For instance, one of the services illustrated in FIG. 6 can provide information from a user to the authentication service 112F to receive information in return that indicates whether or not the requests submitted by the user are authentic.

The policy management service 112G, in one example, is a network service configured to manage policies on behalf of customers or internal users of the service provider network 100. The policy management service 112G can include an interface that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 100 can additionally maintain other services 112 based, at least in part, on the needs of its customers. For instance, the service provider network 100 can maintain a deployment service 112H for deploying program code and/or the data store service 112C in some configurations. The deployment service 112H provides functionality for deploying program code, such as to virtual or physical hosts provided by the on-demand computing service 112A. As also discussed briefly above, the data store service 112C can be a collection of computing resources that collectively operate to create, maintain, and allow queries to be performed on data stores stored within the service provider network 100. For example, a user of the service provider network 100 can operate and manage a data store provided by the data store service 112C by utilizing appropriately configured network API calls. This, in turn, can allow the customer to maintain and potentially scale the operations in the data store. Other services include the IAC service 106, which was described in detail above, object-level archival data storage services, and services that manage, monitor, interact with, or support other services. The service provider network 100 can also be configured with other network services not specifically mentioned herein in other configurations.

Figure 7:
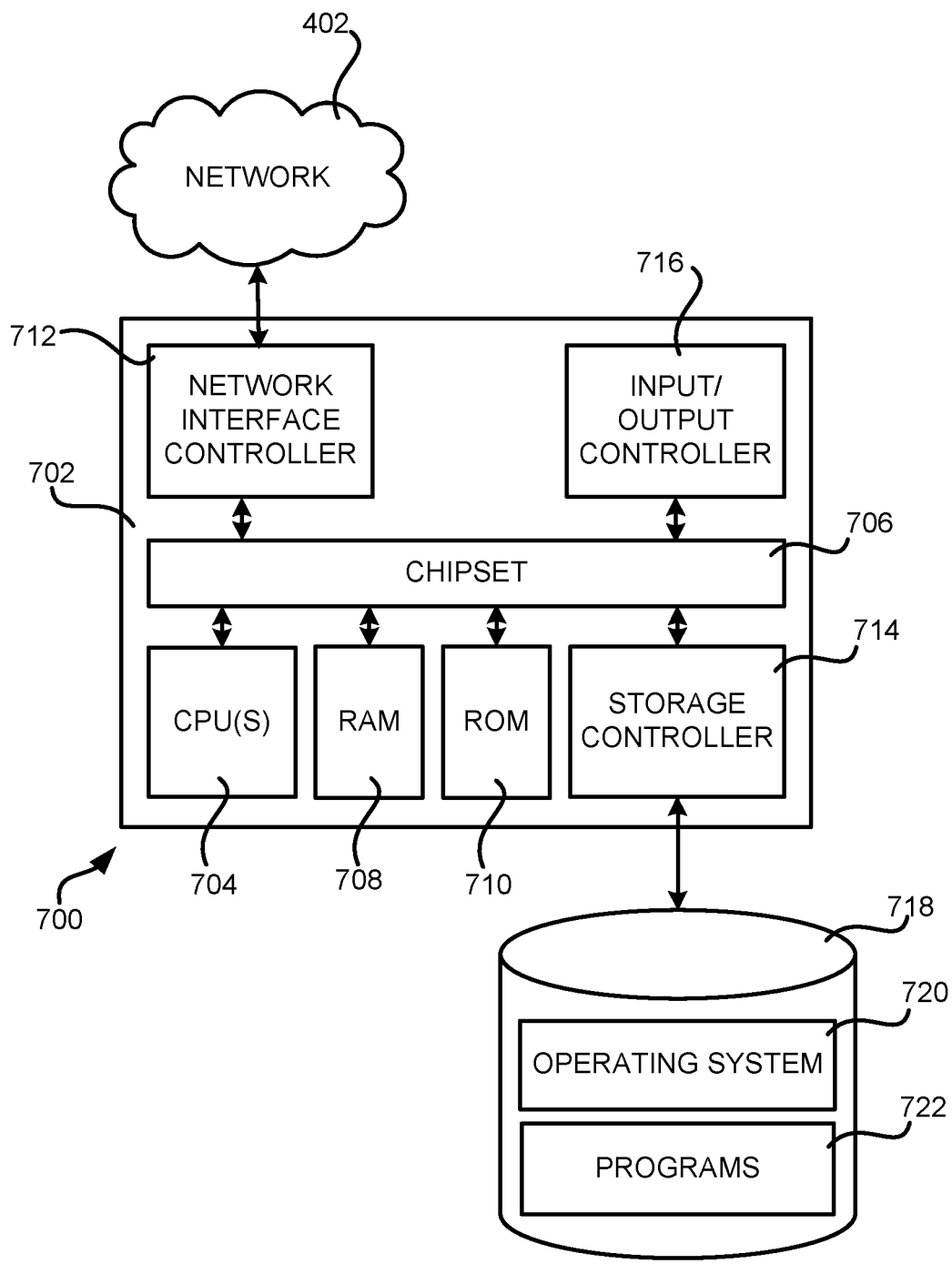
FIG. 7 is a computer architecture diagram illustrating an illustrative computer hardware architecture for implementing a computing device that can be utilized to implement aspects of the various technologies presented herein.

FIG. 7 illustrates an example computer architecture for a computer 700 capable of executing program components for implementing the functionality described above. The computer architecture illustrated in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 402. The chipset 706 can include functionality for providing network connectivity through a NIC 712, such as a gigabit Ethernet adapter. The NIC 712 is capable of connecting the computer 700 to other computing devices over the network 402. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system or one of its variants such as, but not limited to, UBUNTU, DEBIAN, and CENTOS. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-3. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components illustrated in FIG. 7, can include other components that are not explicitly illustrated in FIG. 7, or can utilize an architecture completely different than that illustrated in FIG. 7.

Based on the foregoing, it should be appreciated that technologies for storage and retrieval of resource definitions in a data store during creation and editing of IAC templates have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   a processor; and
   a non-transitory computer-readable storage medium having instructions stored thereupon which, when executed by the processor, cause the apparatus to:
      receive an infrastructure-as-code (IAC) template related to resources available in a service provider network for configuring a stack of desired resources in the service provider network, the IAC template including an identification of a key-value pair associated with resource definitions related to the desired resources, the resource definitions being stored in a data store based upon the key-value pair; and
      consume the IAC template to:
         utilize a look-up function to call a stateless event driven compute service function based at least in part upon the identification of the key-value pair;
         query, using the stateless event driven compute service function, the data store for the resource definitions;
         receive the resource definitions from the data store; and
         configure the stack of the desired resources based at least in part upon the IAC template and the resource definitions to instantiate the desired resources in the service provider network.

2. The apparatus of claim 1, wherein key-value pair comprises (i) a partition key based at least in part upon a name of a user and an application environment and (ii) a sort key based at least in part upon a name of an application.

3. The apparatus of claim 1, wherein the look-up function is included within the IAC template.

4. The apparatus of claim 1, wherein the resource definitions comprise parameter objects and mapping objects.

5. The apparatus of claim 4, wherein the resource definitions comprise data identifying the desired resources, connections among the desired resources and regions within the service provider network.

6. A computer-implemented method for instantiating desired resources in a service provider network, the method comprising:
   receiving an infrastructure-as-code (IAC) template related to resources available in the service provider network for configuring a stack of desired resources in the service provider network; and
   consuming the IAC template to:
      query a data store for resource definitions related to the desired resources based at least in part upon an identification of a key-value pair in the IAC template, the key-value pair being associated with the resource definitions;
      receive the resource definitions from the data store; and
      configure the stack of the desired resources based at least in part upon the IAC template and the resource definitions to instantiate the desired resources in the service provider network.

7. The computer-implemented method of claim 6, wherein querying the data store for resource definitions comprises:

utilizing a look-up function to call a stateless event driven compute service function; and querying, by the stateless event driven compute service function, the data store for the resource definitions.

8. The computer-implemented method of claim 7, wherein the look-up function is included within the IAC template.

9. The computer-implemented method of claim 7, wherein the look-up function is included within an IAC service of the service provider network.

10. The computer-implemented method of claim 6, wherein key-value pair comprises (i) a partition key based at least in part upon a name of a user and an application environment and (ii) a sort key based at least in part upon a name of an application.

11. The computer-implemented method of claim 6, wherein the resource definitions comprise parameter objects and mapping objects.

12. The computer-implemented method of claim 11, wherein the resource definitions comprise identifications of the desired resources, connections among the desired resources, and regions within the service provider network.

13. The computer-implemented method of claim 6, wherein the resource definitions comprise data specifying whether a particular desired resource is an element or a container for other elements.

14. A non-transitory computer-readable storage medium having instructions stored thereupon which are executable by a processor and which, when executed, cause the processor to:

receive an infrastructure-as-code (IAC) template related to resources available in a service provider network for configuring a stack of desired resources in the service provider network; and consume the IAC template to:

query a data store for resource definitions related to the desired resources based at least in part upon an identification of a key-value pair in the IAC template, the key-value pair being associated with the resource definition;

receive the resource definitions from the data store; and configure the stack of the desired resources based at least in part upon the IAC template and the resource definitions to instantiate the desired resources in the service provider network.

15. The non-transitory computer-readable storage medium of claim 14, wherein query the data store for resource definitions comprises:

utilizing a look-up function to call a stateless event driven compute service function to query the data store for the resource definitions.

16. The non-transitory computer-readable storage medium of claim 14, wherein the look-up function is included within the IAC template.

17. The non-transitory computer-readable storage medium of claim 14, wherein the key-value pair comprises (i) a partition key based at least in part upon a name of a user and an application environment and (ii) a sort key based at least in part upon a name of an application.

18. The non-transitory computer-readable storage medium of claim 14, wherein the resource definitions comprise parameter objects and mapping objects.

19. The non-transitory computer-readable storage medium of claim 18, wherein the resource definitions comprise identifications of the desired resources, connections among the desired resources, and regions within the service provider network.

20. The non-transitory computer-readable storage medium of claim 14, wherein the resource definitions comprise data specifying whether a particular desired resource is an element or a container for other elements.

* * * * *